United States Patent [19]

Takeuchi et al.

[11] Patent Number: 4,894,355

[45] Date of Patent: Jan. 16, 1990

[54] FLEXIBLE, WATER-REPELLENT BAKED CARBON PLATE, ITS PRODUCTION, FUEL CELL ELECTRODE, FUEL CELL ELECTRODE PLATE AND ITS PRODUCTION AND FUEL CELL

[75] Inventors: Seiji Takeuchi, Hitachiohta; Katsuya Ebara, Mito; Tomoichi Kamo, Ibaraki; Kazuo Iwamoto, Hitachi; Tatsuo Horiba, Hitachi; Teruo Kumagai, Hitachi; Kouki Tamura, Hitachi; Kunko Kitami, Hitachi, all of Japan

[73] Assignee: Hitachi, Ltd., Tokyo, Japan

[21] Appl. No.: 146,192

[22] Filed: Jan. 20, 1988

Related U.S. Application Data

[62] Division of Ser. No. 787,117, Oct. 15, 1985.

[30] Foreign Application Priority Data

Oct. 17, 1984 [JP] Japan .............................. 59-216229
Dec. 20, 1984 [JP] Japan .............................. 59-269424

[51] Int. Cl.$^4$ .......................... H01M 4/88; B05D 5/12
[52] U.S. Cl. .................................... 502/101; 427/115; 429/42; 429/44
[58] Field of Search .................. 429/42, 44; 427/115; 502/101

[56] References Cited

U.S. PATENT DOCUMENTS

| | | |
|---|---|---|
| 3,829,327 | 8/1974 | Omori et al. . |
| 3,960,601 | 6/1976 | Schulz .............................. 429/218 X |
| 4,017,663 | 4/1977 | Breault .............................. 429/42 X |
| 4,248,682 | 2/1981 | Lindstrom et al. ............... 429/42 X |
| 4,339,325 | 7/1982 | Solomon et al. .................. 429/42 X |
| 4,349,428 | 9/1982 | Lu et al. ............................. 204/294 |
| 4,350,610 | 9/1982 | Jung et al. ......................... 429/42 X |

FOREIGN PATENT DOCUMENTS

2190728 2/1974 France .
1158580 7/1969 United Kingdom .

*Primary Examiner*—Stephen J. Kalafut
*Attorney, Agent, or Firm*—Antonelli, Terry & Wands

[57] ABSTRACT

A fuel cell electrode having a catalyst layer comprising electroconductive particles carrying a catalytically active component and a binder on a water-repellent baked plate comprising a carbon paper comprising carbon fiber and an organic binder and polytetrafluoroethylene infiltrated into voids of said carbon paper, characterized in that the carbon fiber of said baked plate has at least 20 cutting edges per square millimeter, and said polytetrafluoroethylene is infiltrated into at least one of said cutting edges to render the plate flexible.

20 Claims, 11 Drawing Sheets

CUTTING EDGE OF CARBON FIBER

POLYTETRAFLUORO-
ETHYLENE

CARBON FIBER
POLYTETRAFLUOROETHYLENE

CATALYST LAYER  CARBON PAPER PLATE  ×230

FLEXIBLE, WATER-REPELLENT BAKED CARBON PLATE, ITS PRODUCTION, FUEL CELL ELECTRODE, FUEL CELL ELECTRODE PLATE AND ITS PRODUCTION AND FUEL CELL

This application is a divisional application of application Ser. No. 787,117, filed Oct. 15, 1985 now abandoned.

DETAILED DESCRIPTION OF THE INVENTION

1. Field of the Invention

This invention relates to a flexible, water-repellent baked carbon plate, its production process, a fuel cell electrode and a fuel cell in which said carbon plate is used.

The carbon plate of this invention is suitable as an electrode plate of a methanol fuel cell, especially, a layer-built cell formed by stacking a plurality of unit cells.

2. Background of the Invention

A methanol fuel cell or a fuel cell in which phosphoric acid is used as an electrolyte and hydrogen is used as a fuel has electrodes usually comprising a porous electroconductive plate and a catalyst layer. A carbon plate is mainly used as the porous electroconductive plate and particularly a carbon paper is mainly used for a methanol fuel cell. An example of a fuel cell electrode of this kind is described in Japanese Patent Laid-Open No. 96458/1981.

This publication describes that a fuel cell electrode is made by forming a catalyst layer comprising a uniform mixture of catalyst carbon particles and a water-repellent binder on the surface of an electroconductive carbon cloth having open pores. It is also described that the electroconductive carbon cloth having open pores can be made by carbonizing a prebaked carbonaceous woven fabric at high temperature, and that the catalyst carbon particles should contain catalytic metal particles.

According to the study of the inventors of this invention, a carbon electrode plate formed by carbonizing a carbonaceous woven fabric is very brittle. For example, a carbon paper comprising carbon fiber and an organic binder is easily broken and separated when bent. The brittleness of carbon paper is reported also in the above-cited publication. For example, see lines 5 to 10, a left bottom column, page 4.

When electrodes are made by using such brittle carbon plates and assembled into a fuel cell of a layer-built structure, a number of problems arise. For example, when unit cells are stacked and then fastened, the carbon plates are broken, resulting in leakage of a fuel or an oxidizing agent. In addition, many problems arise when the fuel cell is used as a portable electric source. For example, the carbon plates are broken after repeated uses, resulting in leakage of a fuel or an oxidizing agent in the same manner.

Because of the safety of fuel and the low cell voltage, a methanol fuel cell is suitable as a small portable electric source, and is promising as, for example, a portable electric source for domestic electrical appliances and devices, or as an electric source for electrical products for recreation. Therefore, when compared with a stationary fuel cell for electric power, etc., it is necessary that such a cell is diversified in form and durable to vibration, etc. It is unsuitable to use a brittle carbon plate in such a methanol fuel cell as a portable electric source.

SUMMARY OF THE INVENTION

It is an object of this invention to provide a flexible baked plate in which a carbon paper is used.

It is another object of this invention to provide a process for producing a flexible baked plate in which a carbon paper is used.

It is still another object of this invention to provide a fuel cell electrode having a flexible, water-repellent baked plate in which a carbon paper is used, and a fuel cell in which said electrode is used.

The baked plate of this invention comprises a carbon paper into voids of which polytetrafluoroethylene is infiltrated, and carbon fibers constituting the carbon paper are cut into pieces and said polytetrafluoroethylene is infiltrated into at least one of cutting edges.

This invention is based on a finding that a plate obtained by coating a commercially available carbon paper with polytetrafluoroethylene and, after baking, rolling the paper is flexible.

Commercially available carbon paper comprises carbon fiber and a binder and is carbonized by baking at high temperature above 2,000° C. Although carbon papers of various thicknesses are commercially available, those having a thickness of 0.1 to 1 mm are suitable for a methanol fuel cell. As the binder for a commercially available carbon paper, an organic binder such as a phenolic resin is used. This binder is also one carbonized by baking at high temperature. In other words, the binder only fixes the carbon fibers of the carbon paper and has no further binding function for binding or adhering the carbon fiber.

As mentioned above, such a carbonized carbon paper is easily broken even when it is slightly bent in the form of an arch.

When a carbon paper is used as a plate for a fuel cell electrode, it is a usual practice to treat it for imparting water repellency before use. The water repellency can be imparted by impregnating a carbon paper with, for example, a suspension of polytetrafluoroethylene.

The inventors of this invention have succeeded in imparting flexibility to a carbon paper by treating it with polytetrafluoroethylene and rolling the baked carbon paper after baking, and consequently succeeded in obtaining a baked carbon plate having both flexibility and water repellency. Further, we have recognized that it is possible to impart flexibility to it even when the rolling step precedes the baking step. In this case, however, slight deformation of a plate occurs.

The examination about the structures of a plate obtained by treating a commercially available carbon paper with polytetrafluoroethylene and rolling it after baking and a plate obtained when the rolling precedes the baking revealed that they had structures in which the carbon fiber in the carbon paper was cut into pieces and polytetrafluoroethylene was infiltrated into at least one of cutting edges of the carbon fiber.

In the carbon plate before rolling, substantially no cutting edge of the carbon fiber is observed and polytetrafluoroethylene is infiltrated into only voids among the carbon fibers. In the carbon plate of this invention, the carbon fiber is cut by rolling and part of the polytetrafluoroethylene which is infiltrated into the voids among the carbon fibers penetrates by flow into the cutting edges.

It is preferable that the number of the cutting edges of the carbon fiber in the carbon plate of this invention be at least 20 per square millimeter, preferably, within 300 per square millimeter, if possible. When this number is excessively small, no flexibility can be imparted to the plate, whereas when this number is excessively large, the plate is so weak in strength that it is not suitable as a plate for a fuel cell electrode. The number of the cutting edges of the carbon fiber which is greater than 20 per square millimeter is far greater than that in the usual commercially available baked carbon paper and can be achieved by application of a processing such as rolling or pressing. A particularly suitable range of the number of the cutting edges of carbon fiber is 50 to 150.

The polytetrafluoroethylene which is infiltrated into the cutting edges of carbon fiber plays a role of a binder for binding the cut carbon fibers together. Such a binding action of polytetrafluoroethylene cannot be realized when a commercially available baked carbon paper is merely treated with polytetrafluoroethylene. It is the most suitable that the polytetrafluoroethylene is infiltrated into all of the cutting edges of the carbon fiber or it is suitable that it is infiltrated into at least one third of the total number of the cutting edges of the carbon fiber.

By rolling a carbon paper after treating it with polytetrafluoroethylene, clearances are formed at part of the interfaces between the polytetrafluoroethylene infiltrated into the voids among the carbon fibers and the carbon fibers. These clearances are advantageous rather than disadvantageous, because they can impart flexibility to the carbon plate.

The final thickness of the carbon plate of this invention is desirably 0.1 to 1 mm. When the thickness of the carbon plate is increased, the carbon fibers in the interior of the plate can be difficultly cut, which worsens flexibility. The minimum thickness of a carbon plate is determined from the production of the carbon paper, and a carbon plate having the minimum possible thickness attainable in the production can be applied to this invention and can be given flexibility.

The production process of the carbon plate of this invention comprises a step of infiltrating a suspension of polytetrafluoroethylene into a carbon paper, a step of baking the impregnated paper at a temperature of from the melting temperature of the polytetrafluoroethylene to its decomposition temperature, and a step of rolling or pressing the carbon paper. The rolling or pressing may be performed either after or before the step of baking. It is desirable that the baking temperature is in the range of from 330° to 400° C. This step of baking is required to impart a function as a binder to the polytetrafluoroethylene.

As means for breaking carbon fiber, rolling or pressing can be used. It is desirable that the plate thickness reduction rate in this case is 60 to 80%.

An electrode for a fuel cell can be obtained by forming a catalyst layer on the carbon plate of this invention. The structure of the catalyst layer comprises electroconductive particles carrying a catalytically active component and a binder. It is desirable that the electroconductive particles comprise carbon particles which may be acetylene black, furnace black or the like. The catalytically active component is selected from among noble metals of the elements of Group VIII of the Periodic Table, including, for example, platinum, ruthenium, rhodium, palladium and indium, among which platinum is particularly preferable. As regards a method for forming the catalyst layer on the carbon plate, any known method is applicable, including a method described in Japanese Patent Laid-Open No. 96458/1981.

It is desirable that polytetrafluoroethylene is used as the binder for the catalyst layer, and in order to allow this polytetrafluoroethylene to act as a binder, it is necessary that the formed catalyst layer is baked at a temperature of from the melting temperature of the polytetrafluoroethylene to its decomposition temperature. It is desirable that this baking temperature is also within the range of from 330° to 400° C.

When a fuel cell is produced by using a carbon paper treated with polytetrafluoroethylene, the step of rolling or pressing in the production of a carbon plate may be preceded by the step of catalyst layer formation. The final thickness of the catalyst layer is preferably within the range of from 0.05 to 0.5 mm.

The fuel cell of this invention has a pair of opposed electrodes, a fuel chamber and an oxidizing agent chamber. The anode of the electrode pair may be called fuel electrode and the cathode may be called oxidizing agent electrode. In a methanol fuel cell, the fuel chamber is fed with an anolyte containing methanol, and the oxidizing agent chamber is fed with air. While an electrolyte is placed between the pair of the electrodes, this placement can be performed by using an ion exchange membrane containing an electrolyte.

In a methanol fuel cell, a plurality of stacked unit cells are used. The stacked unit cells are fastened with bolts or the like. The fastening pressure reaches as high as above 3 kg/mm² for stacking 40 unit cells. The fuel cell in which the carbon plates of the invention are used as electrode plates is not broken by this fastening pressure.

In a methanol fuel cell, it is desirable that the pore diameter and/or the pore volume of the catalyst layer on the cathode are different from those of the catalyst layer on the anode, with the former being larger. This makes it possible to enhance its cell voltage. In order to differentiate the pore diameter and/or the pore volume of the catalyst layer on the anode from those of the catalyst on the cathode, it is desirable that rolling or pressing is performed after catalyst formation and the plate thickness reduction rate is changed for each case. More particularly, it is desirable that the anode is processed so that the final plate thickness may be 20 to 40% thinner than that before the processing, that is, it is processed so that the final plate thickness may be 60 to 80% of that before processing. It is desirable that the final plate thickness of the cathode is not smaller than 80% of that before the processing, preferably, the reduction in the plate thickness is within 15 to 20% of the thickness before processing.

This invention is directed toward obtaining a flexible fuel cell electrode plate by infiltrating PTFE as a water-repellent binder into carbon paper as a conventionally used electroconductive porous base and rolling the base to cut the carbon fiber of the carbon paper into a plurality of short carbon fibers and fixing the cut carbon fiber pieces by means of the PTFE used as a binder for the carbon fiber. More particularly, the product of this invention consists in a fuel cell electrode plate characterized in that it has a plurality of short carbon fiber pieces and said carbon fiber pieces are fixed by means of a binder in a state in which each carbon fiber piece is connected with an adjacent carbon fiber piece, and claim 8 consists of a process for producing a fuel cell electrode plate having a plurality of short carbon fiber pieces, said carbon fiber pieces being fixed by means of a binder such as PTFE in a state in which each carbon fiber piece is connected with an adjacent carbon fiber piece, characterized by infiltrating a binder into a carbon paper base and rolling said carbon paper base to a thickness equal to 20 to 80% of its initial thickness.

The above fuel cell electrode plate of this invention has a decreased electric resistance because the carbon fibers constituting the electrode plate is cut into fine pieces, and the number of the contact points among the carbon fiber pieces increases, and the thickness of an electrode is reduced by rolling. Specifically, its electric resistance is 0.1 $\Omega cm^2$ or below. In addition, since no PTFE fiber is used in the electrode plate and carbon paper is used as a base, the water repellency is improved and therefore it can be used also in a liquid fuel cell. In addition, it does not have a structure in which carbon powder is embedded in the network of PTFE fiber, it is freed from a problem that the peeling of the electroconductive substance due to heat hystory occurs.

Because each of the carbon fiber pieces is held and fixed by means of PTFE, the above fuel cell electrode plate can show flexibility. "Showing flexibility" means a case where the plate can form a cylinder of a diameter of 1 to 10 cm without being damaged.

In the production of the fuel cell electrode plate of this invention, it is necessary that, after fixing PTFE on a carbon paper base, the carbon paper is baked before or after rolling. By this baking, nonconductive organic substances contained in the carbon paper base can be removed. The PTFE can be fixed on the carbon paper base by immersing the base in a PTFE solution and drying it.

The carbon paper can be rolled by passing it between rollers having a definite gap. The gap between the rollers is adjusted within 20 to 80% of the initial thickness of the carbon paper base. Especially, the gap between the rollers is desirably 60 to 80% of the initial thickness of the base so as to prevent the carbon paper from being broken and prevent a fuel and an oxidizing agent gas from being diffused.

The electrode plate obtained according to this invention is coated with a catalyst layer prepared by allowing a porous carrier such as or carbon black to support platinum or ruthenium to consitute an electrode. Methods for supporting may be any of usual methods for catalyst preparation, such as impregnation, intercurrent method, and kneading method. A catalyst paste prepared by kneading a catalyst powder with distilled water and a binder, for example, PTFE is applied to the plate and the carbon is fixed to form an electrode. The catalyst layer on the flexible plate is given flexibility by the binder, so that it is possible to render the entire electrode flexible by using such a plate. Although the application of the catalyst layer can be performed before or after rolling, the application of the catalyst before rolling is desirable because it is possible to prevent the peeling of the catalyst layer.

DETAILED DESCRIPTION OF THE INVENTION

Figure 1:
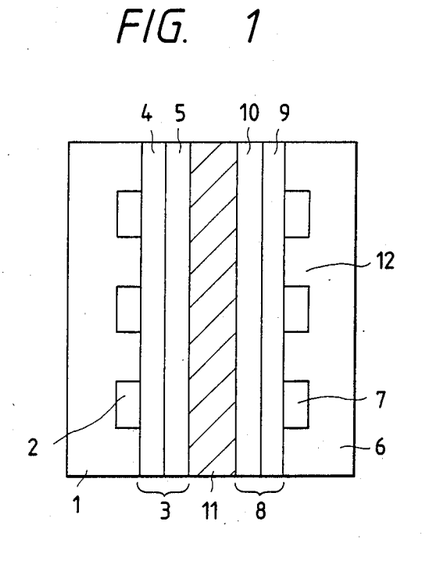
FIG. 1 is a sectional view illustrating the configuration of a methanol fuel cell according to an example of this invention.

FIG. 1 is a sectional view of an example of the unit cell of a methanol fuel cell of this invention. An actual cell has a structure in which a plurality of such cells are stacked.

The unit cell structure of the methanol fuel has a pair of opposed electrodes, i e., an anode 3 and a cathode 8, and an electrolyte-containing ion exchange membrane 11 sandwiched between these electrodes. The anode 3 comprises an electroconductive porous plate 4 and a catalytically active component-carrying electroconductive porous particle layer 5 formed on at least the electrolyte side of the surfaces of said plate. The cathode 8 comprises an electroconductive porous plate 9 and a catalytically active component-carrying electroconductive porous particle layer 10 formed on at least the electrolyte side of the surfaces of said plate.

The anode 3 has a fuel separation plate 1 on the side opposite to the electrolyte, and the surface of this plate 1 (collector plate) in contact with the anode has a plurality of grooves for feeding an anolyte containing methanol. Spaces called fuel chambers 2 are formed by these grooves and the anode which covers the opening of each groove.

Likewise, the cathode 8 has a gas separation plate (collector plate) 6 on the side opposite to the electrolyte, and this plate 6 has a plurality of grooves for feeding a gas containing oxygen. Spaces called oxidizing agent chambers 7 are formed by these grooves and the cathode which covers the opening of each groove.

The structure shown in FIG. 1 is identical with the commonest structure of a unit cell for a methanol fuel cell. When a cell is formed by stacking such unit cells, the cells must be fastened sufficiently in order to decrease contact resistance between the cells to a minimum. As a result of pressing the rib 12 of the separation plate (collector plate) 1 against the electrodes 2 and 8, the relatively hard electrodes are partially broken. As a consequence, the flow of methanol as a fuel into the oxidizing agent electrode or the leakage of the electrolyte into the oxidizing agent chamber occurs, thus causing a decrease in the cell performances.

Therefore, it is necessary to prevent the electrodes from being broken by fastening the stacked cells. For this purpose, it is necessary to impart flexibility to the electrodes as a whole.

One method for imparting flexibility to an electrode comprises using a carbon felt as an electroconductive porous plate serving as an electrode plate instead of the carbon paper. However, because commercially available carbon felt of this kind has a high electric resistance (above 1 $\Omega cm^2$) and a large output drop due to IR loss, it is far from a practical plate material.

Therefore, studies were made on the rolling of a conventional electrode.

As a result of these studies, it was found that high flexibility could be imparted to a conventional electrode by rolling it. A similar result could be obtained by pressing.

As regards the anode, because of the use of a liquid fuel, a good fuel electrode could be obtained by passing a conventional electrode at least several times between rollers having a gap of 80% of the initial thickness of the electrode. The thickness of a rolled electrode is desirably 60 to 80% of the initial thickness of the electrode. On the other hand, an air electrode is desired to have a thickness of at least 80% of its initial thickness because it is a gas diffusion electrode and the diffusion of the gas is inhibited by the electrolyte when its thickness is reduced by rolling.

EXAMPLE 1

A 0.5 mm thick commercially available carbon paper was rolled. This carbon paper was composed of carbon fiber and an organic binder and carbonized by high temperature baking. When bent, the carbon paper before rolling was broken at a bending angle of 60°. When bent, the carbon paper after rolling was not broken at a bending angle of 60° and could be formed into a cylinder having a diameter of 5 cm.

Figure 2:
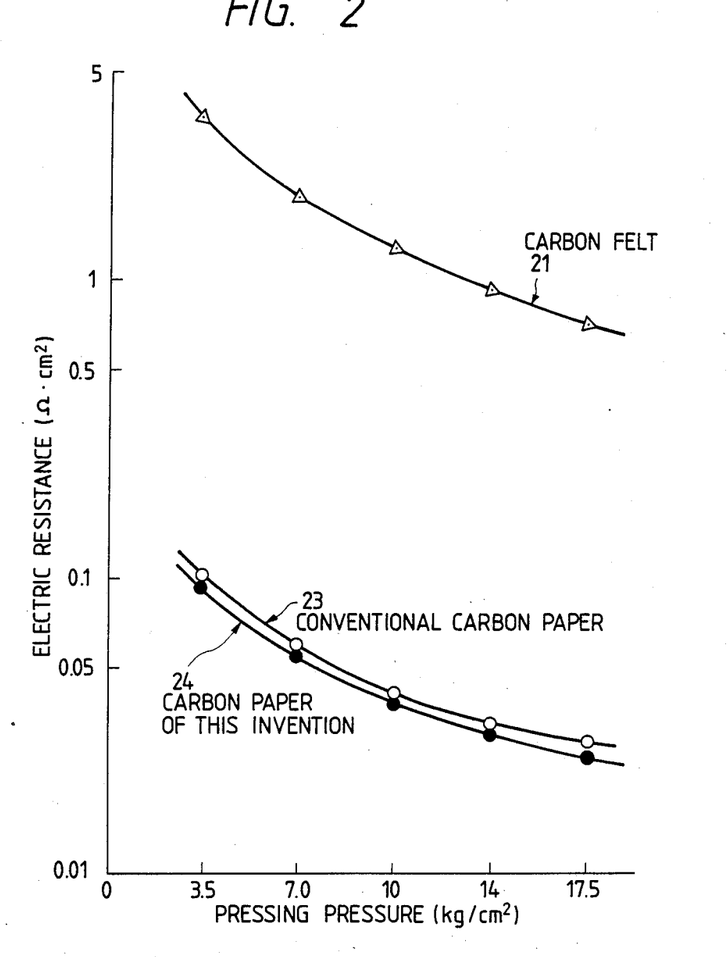
FIG. 2 is a characteristic diagram showing the relationships between electric resistances and pressing pressures for various carbon plates.

In order to determine their applicability to fuel cell electrodes, the above two carbon papers and a commercially available carbon felt were measured for their electric resistances. The measurement was made by sandwiching a carbon paper or a carbon felt between two metallic plates acting as collector plates and pressing the metallic plates against the carbon paper or the carbon felt. FIG. 2 shows the relationship between electrical resistances and pressing pressures.

When rolled, the carbon paper was decreased slightly in electrical resistance and became more suitable as a plate for fuel cell electrode.

EXAMPLE 2

This example describes the results of measurements of the flexibility of electrodes, electric resistances, changes in thickness, and single electrode potentials of anodes and cathodes about a conventional anode and cathode which had been reduced in thickness to about 70% of its initial electrode thickness by rolling.

These anode and cathode were made according to the following procedure.

Anode: A PTFE-pretreated carbon paper plate (4 mg/cm2 PTFE) was coated with a paste obtained by adding a catalyst powder (carrying 30 wt. % Pt) obtained by wet reduction to provide a platinum/ruthenium atomic ratio of 1:1 and Polyflon dispersion D-1 (a product of Daikin Industries Co., Ltd.) to furnace black so that the content of polytetrafluoroethylene (hereinafter abbreviated as PTFE) might be 30 wt. % and baked in air at 300° C. for 30 minutes.

Cathode: A paste obtained by mixing furnace black with a catalyst powder (carrying 30 wt. % Pt) prepared by wet reduction of Pt and the above dispersion in an amount to provide a PTFE content of 30 wt. % was applied to a PTFE-pretreated carbon paper plate (8 mg/cm$^2$ PTFE) and baked in air at 300° C. for 30 minutes.

The above electrodes were rolled so that the final thicknesses of the electrodes might be about 70% of the initial thicknesses. The electrode before rolling (conventional one) was broken into two pieces when it was bent at a bending angle of 60° or larger. However, the electrode was not damaged at all even when it was formed into a cylinder of a diameter of about 3 cm after rolling.

Figure 3:
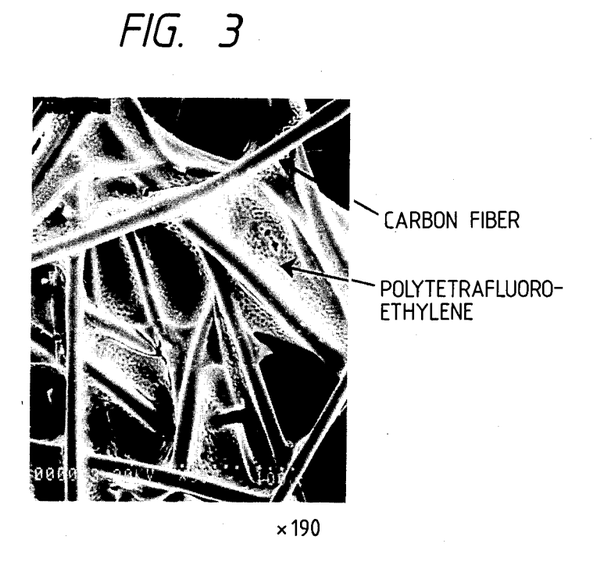
FIG. 3 shows a photograph from a scanning electron microscope, showing the state of a carbon plate in a conventional electrode.
Figure 4:
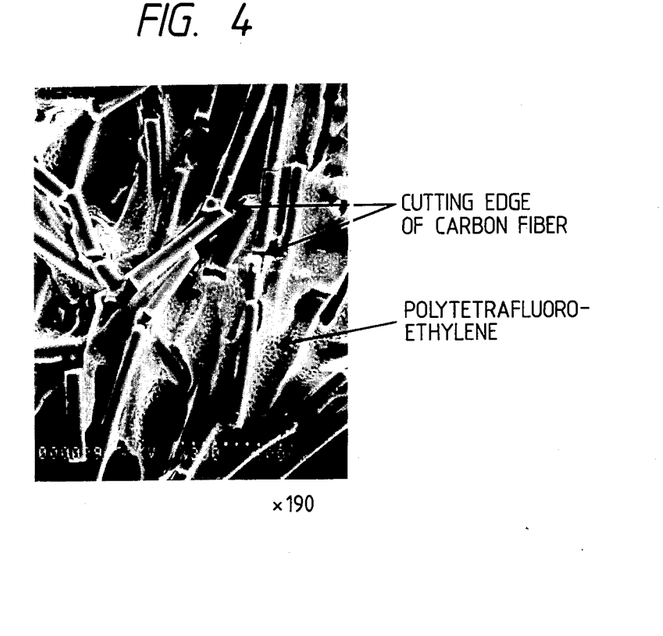
FIG. 4 is a photograph from a scanning electron microscope, showing the state of the carbon fibers of the electrode of this invention.

With the conventional electrode and that of this invention, the state of carbon fiber on the surface on which no catalyst layer was formed was observed with the aid of photographs of a scanning electron microscope. FIG. 3 is a photograph of a conventional electrode, and FIG. 4 is a photograph of an example of this invention. The magnification was ×190 in each case.

In the electrode of this invention, the carbon fiber was cut into fine pieces. The number of the cutting edges was overwhelmingly larger than that of the conventional example in FIG. 3. Polytetrafluoroethylene was infiltrated into a considerable portion, i.e., about at least one third of the cutting edges of the carbon fiber and functions as a binder for binding the cut carbon fiber pieces. As regards the number of the interfaces between the carbon fibers and the polytetrafluoroethylene, it was larger in the invention than in the conventional example.

Figure 5:
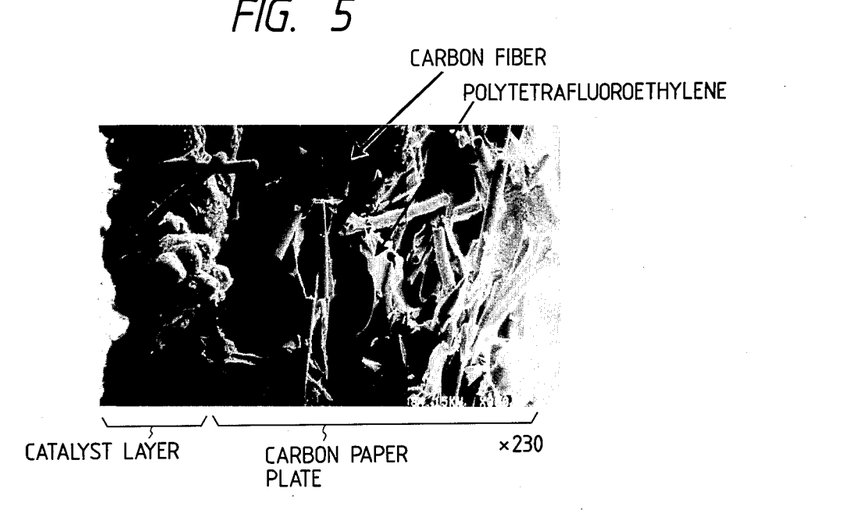
FIG. 5 is a photograph from a scanning electron microscope, showing the state of the carbon fibers at the section of the conventional electrode.
Figure 6:
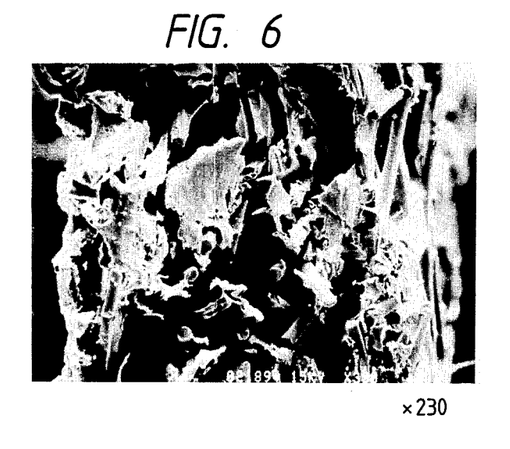
FIG. 6 is a photograph from a scanning electron microscope, showing the state of the carbon fibers at the section of the electrode of this invention.

FIGS. 5 and 6 show photographs from a scanning electron microscope showing the state of carbon fibers on the section of an electrode. FIG. 5 shows a photograph of a conventional electrode, and FIG. 6 shows a photograph of the electrode of this invention. The magnification was ×230 in each case.

While the conventional electrode had a catalyst layer thickness of about 120 μm and a plate thickness of 350 μm, the electrode of this invention in which the boundary between the catalyst layer and the plate was not clear had a catalyst layer thickness of about 52 μm and a plate thickness of about 300 μm, and thus, the thickness of the electrode after rolling corresponded to about 75% of its initial thickness. In more detail, the thickness of the catalyst layer was decreased to 43% and that of the plate was decreased to 86%, suggesting that the thickness of the catalyst layer was markedly changed by rolling.

Figure 7:
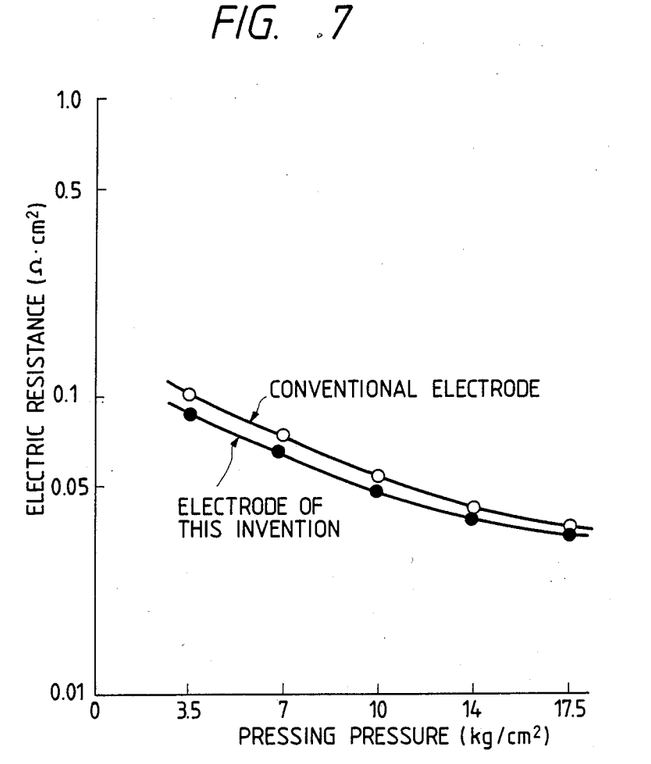
FIG. 7 shows characteristic diagrams of the electric resistances of electrodes.

FIG. 7 shows the results of measurements of their electric resistances. As FIG. 7 shows, the resistances of both the conventional and the invention electrodes were 0.1 $\Omega cm^2$ or below at 3.5 kg/cm$^2$ and the electrode of this invention had a somewhat smaller value, though these values varied with pressing pressure. Here, the measurements were made by the four-terminal resistor method.

Figure 8:
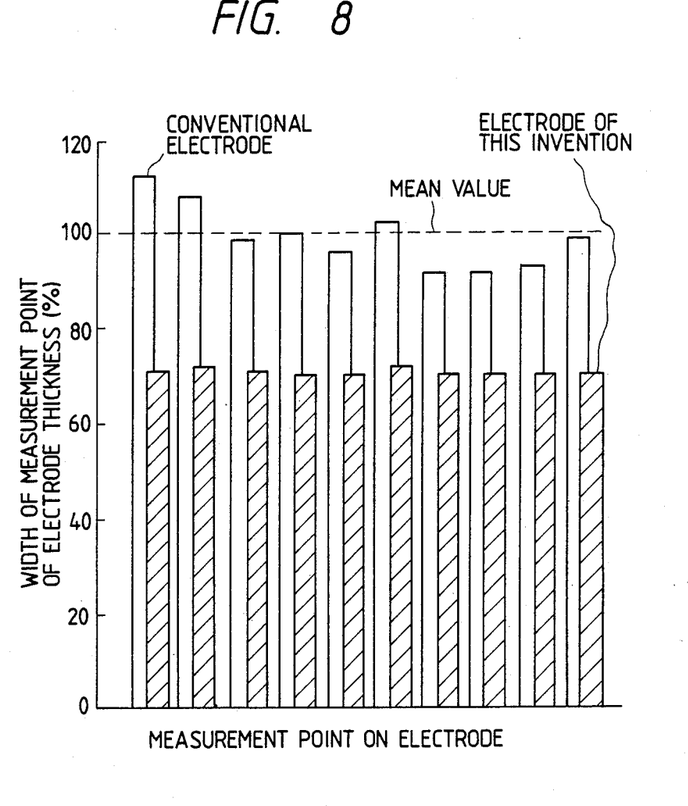
FIG. 8 is a characteristic diagram showing the relationship between the width of a measurement point about an electrode thickness and a measurement point.

FIG. 8 shows the width in percentage obtained when the thicknesses of each of the conventional electrode before and after rolling were measured at ten points. A dispersion of ±10% was observed for the electrode before rolling, while a dispersion of 1.5% was observed for the electrode after rolling, which represented a markedly improved accuracy of electrode thickness.

Figure 9:
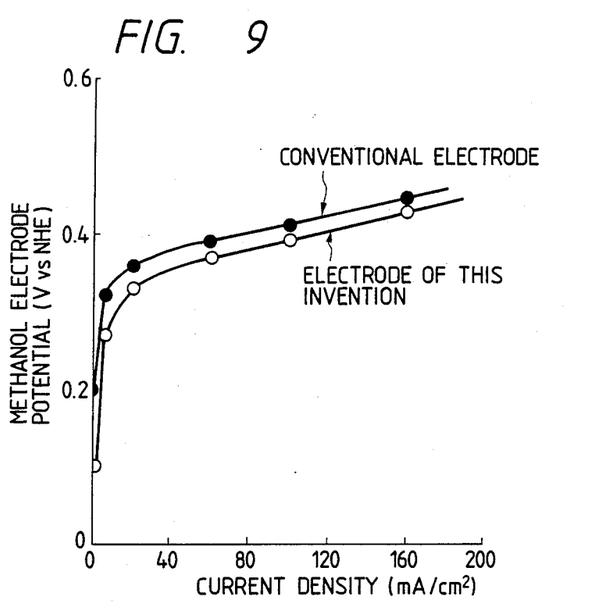
FIG. 9 is a characteristic diagram showing the current density-anode performance.

FIG. 9 shows the results of measurements of the current density-potential characteristic about the conventional electrode before rolling and the anode of this invention. As regards the performances of a methanol electrode, the lower its potential, the better its performances. As FIG. 9 shows, the electrode of this invention showed performances which were better by about 25 mV at a current density of 60 mA/cm$^2$. This difference became marked on the side of lower current density. The reaction at the methanol electrode is a reaction in which carbon dioxide gas is formed, as shown by the following formula:

Although this reaction was accompanied by many reactions and, so, its reaction mechanism is not clear, it was presumed that the plate played a peculiar behavior on the side of lower current density through some contribution of changes in the surface of the electrode of this invention.

Figure 10:
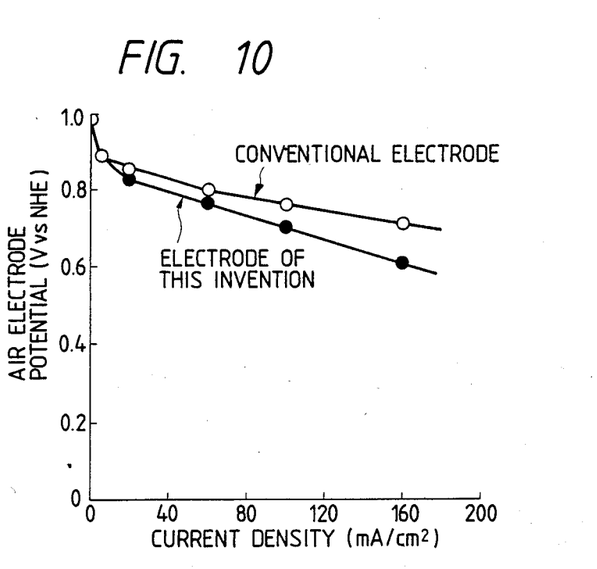
FIG. 10 is a characteristic diagram showing the current density-potential of a cathode.

FIG. 10 shows the results of measurements of the cathode.

As FIG. 10 shows, when compared with the electrode before rolling, the electrode of this invention was markedly decreased in the performance on the side of higher current density though its electric resistance was decreased. This was understood as follows. The pore volume of the catalyst layer was decreased by rolling, and in this case, if the same amount of an electrolyte was infiltrated into the pores, the space for gas to form an interface among three phases of gas-liquid-solid, i.e., the space for gas diffusion, was hindered, which caused lowered performances.

EXAMPLE 3

Figure 11:
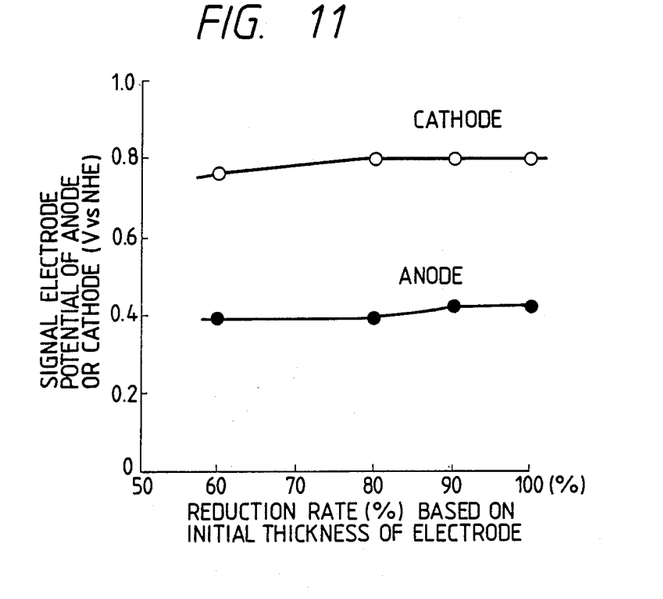
FIG. 11 is a characteristic diagram showing the relationship between the compaction rate of an anode or a cathode, and potential.

Because it was presumed that an optimal range should be present in the compaction of the catalyst layer on the anode or the cathode by rolling, the relationship between reduction rates based on the initial electrode thickness and performances was determined. FIG. 11 shows the results. The potential in this figure represents a value at a current density of 60 mA/cm$^2$. As regards the anode, a nearly constant potential was shown at a thickness corresponding to 80 to 60% of the initial thickness of the electrode, and this anode was improved by about 25 mV as compared with the conventional electrode. On the other hand, as regards the cathode, its performances changed slightly within a thickness corresponding to about 80% of the initial thickness of the electrode, but markedly decreased when the thickness was decreased beyond this value. The above results revealed that the limit of the thickness reduction rate was 60 to 80% for an anode and 80% for a cathode in relation to the initial thickness of an electrode.

Figure 12:
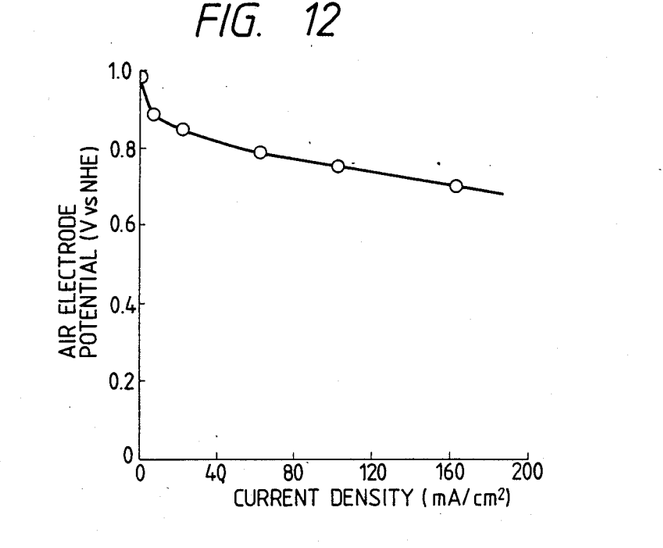
FIG. 12 is a characteristic diagram showing the current density-potential of a cathode.

FIG. 12 shows the results of measurements of the current-potential characteristic of an air anode having a thickness of 80% after rolling. Quite the same characteristic as shown in FIG. 10 for the conventional electrode before rolling was obtained.

EXAMPLE 4

Figure 13:
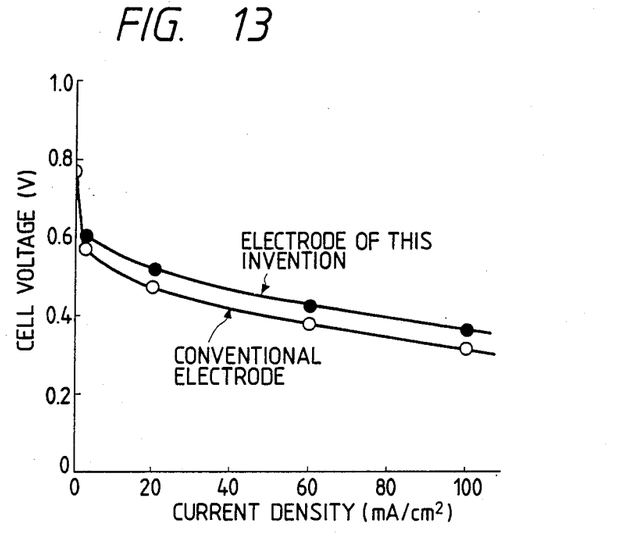
FIG. 13 is a diagram showing the current density-voltage of a unit cell.
Figure 14:
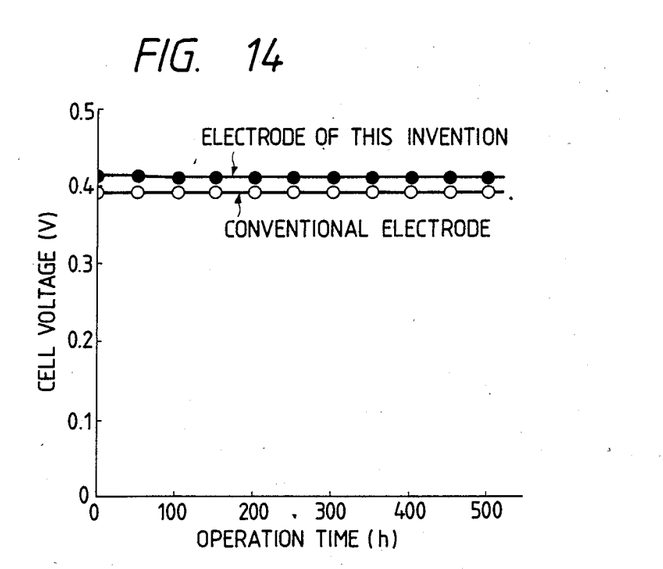
FIG. 14 is a diagram showing the relationship between cell voltages and operation times.

In this example, the current density-voltage characteristic of a unit cell in which the present invention anode obtained in FIG. 9 and the cathode obtained in FIG. 12 were utilized were determined. FIG. 13 shows the results. It shows also the characteristic diagram of a unit cell in which conventional electrodes were used. The available area of an electrode of a cell used in this example was 25 cm$^2$, the anolyte used as a fuel was 1.0 mol/l CH$_3$OH-1.5 mol/l H$_2$SO$_4$, and the measurement temperature was 60° C.

The characteristics of the cathode of this invention were nearly the same as those of the conventional electrode, while those of the anode were improved by about 25 mV at a current density of 60 mA/cm$^2$. However, when assembled into a cell, it showed a voltage higher by 15 mV than its single electrode potential, that is, higher by 40 mV (60 mA/cm$^2$) than the conventional cell. This could be understood as follows. When compacted, the electrode could be given flexibility and became uniform in the thickness of an electrode, so that the adhesion among an electrode, an ion exchange membrane and a collector plate was increased.

EXAMPLE 5

This example is concerned with a life test of the unit cell obtained in Example 1. This unit cell was discharged at a constant current density of 60 mA/cm$^2$, and its voltage change was measured. The temperature was 60° C. and the anolyte contained 1.0 mol/l CH$_3$OH-1.5 mol/l H$_2$SO$_4$. As compared with a cell having a conventional electrode, the cell of this invention showed a voltage higher by about 40 mV, and both of these cells showed each a voltage drop of about 10 mV in relation to the initial voltage after 500 hours, but gave almost stable results.

The invention will now be described in more detail with reference to examples.

ELECTRODE PLATE PREPARATION EXAMPLE 1

A carbon paper, which was a conventional electroconductive porous base, was immersed in an aqueous solution of Polyflon dispersion D-1 (Daikin Industries, Co., Ltd.) to infiltrate 4 mg/cm$^2$ of PTFE into the paper and, after drying, it was baked in a baking oven at 300° to 400° C. for 1 hour. The obtained plate was rolled to about 70% of the initial thickness of the plate to obtain a flexible plate A.

ELECTRODE PLATE PREPARATION EXAMPLE 2

A flexible plate was obtained by preparing a plate in the same way as in Preparation Example 1 except that 8 mg/cm$^2$ of PTFE was infiltrated into the carbon paper as used in Preparation Example 1. The obtained plate is referred to as flexible plate B.

COMPARATIVE EXAMPLE 1

Comparison was made among the bending limits of a plate prepared by fixing 8 mg/cm$^2$ of PTFE on a conventional carbon paper plate and the above flexible plates A and B.

The conventional carbon paper plate, even when fixed with PTFE, was divided into two pieces at a bending angle of 60° or larger. On the contrary, flexible plates A and B could be formed into cylinders of a diameter of about 5 cm without being damaged at all even when they had same sizes as that of the conventional plate.

COMPARATIVE EXAMPLE 2

Comparison was made among the electrical resistances of flexible plate B, the conventional carbon paper plate, a carbon felt, and a carbon film. FIG. 2 shows the measured values of their electric resistances.

In FIG. 2, 21 is a graph for carbon felt, b 23 is a graph for carbon paper, and 24 is a graph for the flexible plate. With respect to the order of their resistance values, the flexible plate B had the smallest resistance value, and their values were increasing in the following order: carbon paper, carbon film, and carbon felt. The carbon felt and the carbon film had high resistance values because they were not baked and so contained organic compounds of high electric resistance as impurities. The electric resistance of flexible plate B was smaller than that of the carbon paper because the carbon fibers constituting flexible plate B were cut into pieces and had more connection points. The measurement was made by the four-terminal resistor method (1000 Hz).

CATALYST PREPARATION EXAMPLE 1

50 ml of a 37% formaldehyde solution and 100 ml of a 50% potassium hydroxide solution were added to 20 g of carbon powder (furnace black, a product of Cabot Corporation), and distilled water was added to the mixture to form 500 ml of a solution. This solution was cooled by stirring to 0±2° C. To this solution a solution formed by dissolving 28 g of chloroplatinic acid and 14 g of ruthenium chloride in distilled water in an amount to form 500 ml of a solution was added, while the temperature of the solution was being kept at 0±220 C. After completion of this addition, the mixture was allowed to stand to cool to room temperature and agitated at 35° to 40° C. for 2 hours and then at 55 to 60° C. for about 2 hours. After completion of the agitation, the solids were washed with water repeatedly until the pH of the slurry was decreased to 7 or below. After the washing, the solids were fully dried in a dryer at 60° C. to obtain a fuel electrode catalyst A.

CATALYST PREPARATION EXAMPLE 2

1 l of a (1:1) methanol/water mixture was added to 15 g of carbon powder (furnace black, a product of Cabot Corporation), and 31 g of chloroplatinic acid was dissolved therein. The resulting solution was agitated by heating at 70° C. for about 5 hours. After completion of the agitation, the solids were washed repeatedly until the pH was decreased to 7 or below. The cake after washing was dried at 60° C. to obtain oxidizing agent electrode catalyst B.

ELECTRODE PREPARATION EXAMPLE 1

1.15 g of catalyst powder A was weighed out and, after adding thereto 2 ml of distilled water, the mixture was kneaded thoroughly and mixed with 1 ml of a PTFE dispersion (a product of Daikin Co., Polyflon dispersion D 1, diluted to a 1/2.5 concentration) as used in Plate Preparation Example 1. A flexible plate (100×128 mm) was uniformly coated with the resulting paste catalyst and, after drying in air, it was baked for about 30 minutes in a nitrogen atmosphere at 300° C. Fuel electrode A was obtained by this procedure.

ELECTRODE PREPARATION EXAMPLE 2

An electrode was prepared in the same way as in Electrode Preparation Example 1 except that a conventional carbon paper plate was impregnated with 4 mg/cm$^2$ of the PTFE dispersion. This electrode is referred to as fuel electrode B.

ELECTRODE PREPARATION EXAMPLE 3

0.77 g of catalyst powder B was weighed out and, after adding distilled water, the mixture was kneaded and mixed with 0.55 ml of Polyflon dispersion D 1. The obtained paste was applied to flexible plate B (100×128 mm). After drying in air, it was baked in air at 300° C. for about 30 minutes. This is referred to as oxidizing agent electrode A.

ELECTRODE PREPARATION EXAMPLE 4

An electrode was prepared in the same way as in Electrode Preparation Example 3 except that 8 mg/cm$^2$ of PTFE was infiltrated into a conventional carbon paper plate. This electrode is referred to as oxidizing agent electrode B.

VOLTAGE MEASUREMENT EXAMPLE 1

This example was carried out by constituting a unit cell from fuel electrode A and oxidizing agent electrode A in each of which a flexible plate was used and measuring the current density-voltage characteristic of the unit cell. An ion exchange membrane (a product of Asahi Chemical Industry Co., CMV) impregnated with 3 mol/l of sulfuric acid, as an electrolyte, was sandwiched between the electrodes. An anolyte (1 mol/l methanol/1.5 mol/l sulfuric acid) was fed as a fuel and air was fed as an oxidizing agent. The temperature of the unit cell was 60° C. Curve 31 in FIG. 15 shows the results.

COMPARATIVE EXAMPLE 3

Current density-voltage characteristics were measured in the same way as in Voltage Measurement Example 1 except that fuel electrode B and oxidizing agent electrode B were used. Curve 32 in FIG. 15 shows the results.

Figure 15:
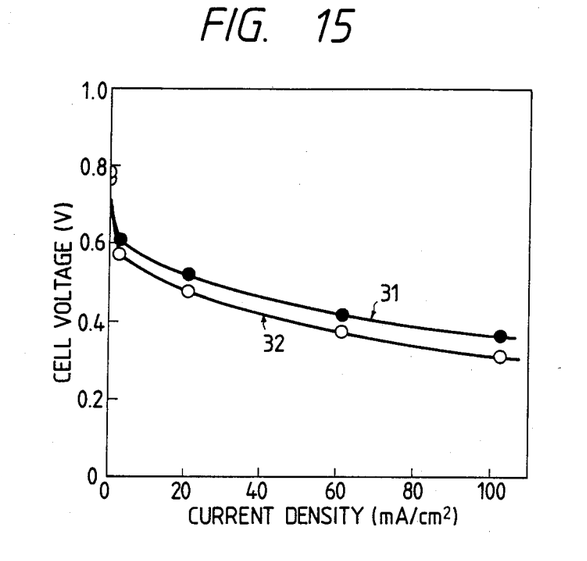
FIG. 15 is a graph showing a relationship between a current density and a cell voltage.

FIG. 15 shows that the unit cell in which the flexible plate of this invention was used showed a voltage higher by 30 mV (60 mA/cm$^2$) than that of the cell in which a conventional plate was used. This is because the adhesion of the electrodes to the ion exchange membrane and to the separator was improved through the flexibility of the plate of this invention.

VOLTAGE MEASUREMENT EXAMPLE 2

This example was performed by continuously operating the unit cell used in Voltage Measurement Example 1 at a current density of 60 mA/cm$^2$. The temperature was kept at 60° C. and the anolyte was 1 mol/l methanol/1.5 mol/l H$_2$SO$_4$. Curve 41 in FIG. 16 shows the results of a 600-hour continuous operation.

COMPARATIVE EXAMPLE 4

Figure 16:
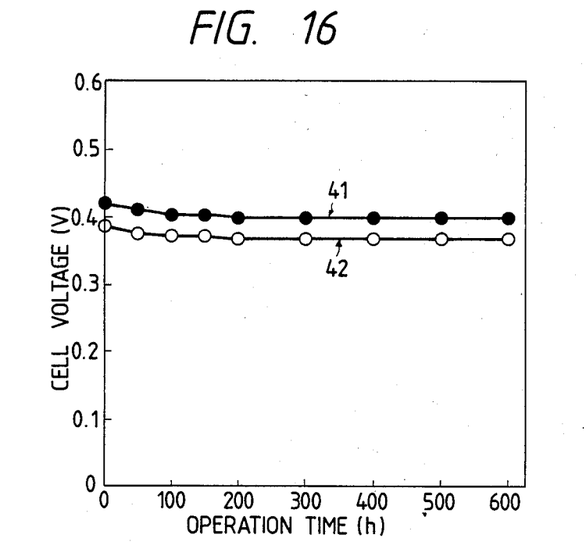
FIG. 16 is a graph showing a relationship between an operation time and a cell voltage.

Curve 42 in FIG. 16 shows the results of a continuous operation performed in the same way as in Voltage Measurement Example 2 except that the units cell in Comparative Example 3 was used.

FIG. 16 shows that both of the cells were stable at a point where their voltages were decreased by about 20 mV from their initial voltages after 600 hours, and the cell of this invention had a voltage higher by about 30 mV than that of the cell in which a conventional carbon paper plate was used.

According to the process of this invention, the electrodes can be imparted sufficient flexibility which, in turn, improves adhesion around the electrodes and enhances the cell performance.

What is claimed is:

1. A process for producing a flexible, water-repellent baked carbon plate, comprising the steps of: infiltrating a suspension of polytetrafluoroethylene into a carbon paper comprising carbon fiber and a carbonized binder made from an organic binder so as to form an impregnated carbon paper, baking the impregnated carbon paper, and rolling or pressing the carbon fiber to effect cutting of said carbon fiber so as to provide cutting edges, wherein said step of rolling or pressing is effected after the step of baking, and infiltration of part of said polytetrafluoroethylene into the cutting edges.

2. A process for producing a flexible, water-repellent baked carbon plate according to claim 1, wherein the heating temperature in said step of baking is within the range of from the melting temperature of the polytetrafluoroethylene to its decomposition temperature.

3. A process for producing a flexible, water-repellent baked carbon plate according to claim 1, wherein the heating temperature in said step of baking is within the range of from 330° to 400° C.

4. A process for producing a flexible, water-repellent baked carbon plate according to claim 1, wherein the thickness of the plate before the processing is reduced to 60 to 80% by said rolling or pressing.

5. A process for producing a flexible, water-repellent baked carbon plate according to claim 1, wherein said rolling or pressing is performed so as to provide 20–300 cutting edges per square millimeter.

6. A process for producing a flexible, water-repellent baked carbon plate according to claim 5, wherein the rolling or pressing is effected so as to provide 50–150 cutting edges per square millimeter.

7. A process of producing a flexible, water-repellent baked carbon plate, comprising the steps of:

infiltrating a suspension of polytetrafluoroethylene into a carbon paper comprising carbon fiber and a carbonized binder made from an organic binder and binding the carbon fiber so as to impregnate the carbon paper with polytetrafluoroethylene;

baking the carbon paper impregnated with the polytetrafluoroethylene at a temperature in a range from a melting point temperature of the polytetrafluoroethylene to a decomposition temperature thereof; and subjecting the carbon paper to thickness reduction to effect cutting of the carbon fibers into short fibers to provide a number of cutting edges and to infiltrate part of the polytetrafluoroethylene into the cutting edges to bind the carbon fiber having the cutting edges, said subjecting the carbon paper to thickness reduction being performed after said baking the carbon paper, thereby providing a baked carbon plate with flexibility and water-repellency.

8. A process of producing a flexible, water-repellent baked carbon plate according to claim 7, wherein, in the step of subjecting the carbon paper to thickness reduction, the thickness of the carbon paper is reduced to 60 to 80% of the thickness before the reduction.

9. A process of producing a flexible, water-repellent baked carbon plate according to claim 7, wherein said carbon plate impregnated with polytetrafluoroethylene is baked at a temperature of 330°–400° C.

10. A process of producing a flexible water-repellent baked carbon plate according to claim 7, wherein said thickness reduction is carried out by rolling of the carbon paper.

11. A process of producing a flexible fuel cell electrode, comprising the steps of:

preparing a carbon paper comprising carbon fiber and a carbonized binder made from an organic binder;

infiltrating a suspension of polytetrafluoroethylene into the carbon paper so as to provide a carbon paper impregnated with polytetrafluoroethylene;

kneading a mixture of catalyst powder and a polytetrafluoroethylene dispersion to provide a paste catalyst;

coating the paste catalyst on the carbon paper;

baking the coated carbon paper impregnated with polytetrafluoroethylene at a temperature more than a melting point temperature of the polytetrafluoroethylene and not more than a decomposition temperature thereof; and reducing thickness of the coated carbon paper to cut the carbon fiber so as to provide a number of cutting edges thereof and to cause the polytetrafluoroethylene to infiltrate into the cutting edges to bind the carbon fiber having the cutting edges, thereby providing a flexible fuel cell electrode comprising a baked carbon plate and a catalyst layer thereon.

12. A process of producing a flexible fuel cell electrode according to claim 11, wherein said catalyst layer comprises carbon particles carrying a noble metal selected from the group consisting of the elements of Group VIII of Periodic Table and a binder.

13. A process of producing a fuel cell electrode, according to claim 12, wherein said coated carbon plate is baked at a temperature of 330°–400° C.

14. A process of producing a flexible fuel cell electrode according to claim 11, wherein said baked carbon plate has a thickness of 0.1 to 1 mm.

15. A process of producing a flexible fuel cell electrode according to claim 11, wherein said thickness reduction is carried out by rolling of the carbon paper.

16. A process of producing a flexible fuel cell electrode according to claim 11, wherein said catalyst layer has a thickness within a range of 0.05–0.5 mm.

17. A process of producing a fuel cell having an anode and a cathode forming a pair of opposed electrodes, an electrolyte placed between said pair of opposed electrodes, a fuel chamber adjacent to the anode of said pair of opposed electrodes, an oxidizing agent chamber adjacent to the cathode of said pair of opposed electrodes, and a catalyst layer formed on the electrolyte side of said pair of electrodes, wherein said pair of opposed electrodes having the catalyst layer are produced by a process comprising the steps of:

preparing a carbon paper comprising carbon fiber and a carbonized binder made from an organic binder;

infiltrating a suspension of polytetrafluoroethylene into the carbon paper so as to provide a water-repellent carbon paper;

kneading a mixture of catalyst powder and a polytetrafluoroethylene dispersion to provide a paste catalyst;

coating the paste catalyst on the water-repellent carbon paper;

baking the coated carbon paper at a temperature more than a melting point temperature of the polytetrafluoroethylene and not more than a decomposition temperature thereof; and reducing the thickness of the carbon paper to cut the carbon fiber so as to provide a number of cutting edges thereof and to cause the polytetrafluoroethylene to infiltrate into the cutting edges to bind the carbon fiber having the cutting edges, thereby providing a flexible fuel cell electrode.

18. A method of producing a fuel cell according to claim 17, wherein said fuel chamber is fed with an anolyte containing methanol.

19. A method of producing a fuel cell according to claim 17, wherein the catalyst layer is formed on the electrolyte side of each of the anode and cathode of the pair of opposed electrodes, and wherein the catalyst layer of said cathode has at least one of a larger pore diameter and a larger pore volume than the catalyst layer of said anode.

20. A method of producing a fuel cell according to claim 17, wherein an ion-exchange membrane containing the electrolyte is provided between said pair of opposed electrodes.

* * * * *